United States Patent
Schmelz et al.

(10) Patent No.: US 11,115,271 B1
(45) Date of Patent: Sep. 7, 2021

(54) NETWORK SLICE CONFIGURATION

(71) Applicant: NOKIA SOLUTIONS AND NETWORKS OY, Espoo (FI)

(72) Inventors: Lars Christoph Schmelz, Haar (DE); Wieslawa Wajda, Keltern (DE); Christian Mannweiler, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/179,163

(22) Filed: Feb. 18, 2021

(30) Foreign Application Priority Data

Mar. 31, 2020 (FI) ...................................... 20205321

(51) Int. Cl.
*G06F 15/16* (2006.01)
*H04L 12/24* (2006.01)
*H04W 28/24* (2009.01)

(52) U.S. Cl.
CPC ...... *H04L 41/0813* (2013.01); *H04L 41/5009* (2013.01); *H04W 28/24* (2013.01)

(58) Field of Classification Search
None
See application file for complete search history.

(56) References Cited

U.S. PATENT DOCUMENTS

| | | | | |
|---|---|---|---|---|
| 10,795,598 | B1 * | 10/2020 | Vohra | G06F 3/0653 |
| 10,986,622 | B2 * | 4/2021 | Zhang | H04W 72/042 |
| 2007/0130231 | A1 * | 6/2007 | Brown | G06F 11/3409 |
| 2017/0085493 | A1 | 3/2017 | Senarath et al. | |

(Continued)

FOREIGN PATENT DOCUMENTS

| | | |
|---|---|---|
| EP | 3306987 A1 | 4/2018 |
| EP | 3327990 A1 | 5/2018 |

(Continued)

OTHER PUBLICATIONS

Office Action dated Jun. 25, 2020 corresponding to Finnish Patent Application No. 20205321.

(Continued)

*Primary Examiner* — Gerald A Smarth (74) *Attorney, Agent, or Firm* — Squire Patton Boggs (US) LLP (57) ABSTRACT

Apparatuses and methods in a communication system are provided. A method comprises receiving a service request comprising service requirements; determining, based on the service request, service level specification of the request, the service level specification comprising performance parameters and network functions to support the requested service; normalizing the determined service level specification by scaling the performance parameters according into a given normalization model of the network to obtain normalized service level specification; determining, based on the network functions and the given normalization model, normalized performance capability of the network functions and a configuration of a network slice supporting the requested service; comparing the normalized service level specification to the normalized performance capability; and determining, based on the comparison, whether the requested service can be realized with the network slice, and if so, create the slice.

15 Claims, 5 Drawing Sheets

(56) References Cited

U.S. PATENT DOCUMENTS

| | | | |
|---|---|---|---|
| 2018/0123878 A1 | 5/2018 | Li et al. | |
| 2019/0238574 A1* | 8/2019 | Iliofotou | H04L 63/1425 |
| 2020/0137678 A1 | 4/2020 | Katsumata et al. | |
| 2020/0167258 A1* | 5/2020 | Chattopadhyay | G06F 9/5011 |
| 2020/0296155 A1* | 9/2020 | McGrath | G06F 9/547 |
| 2021/0092759 A1* | 3/2021 | Xiong | H04W 72/1289 |

FOREIGN PATENT DOCUMENTS

| | | |
|---|---|---|
| EP | 3 461 087 A1 | 3/2019 |
| WO | 2018/173564 A1 | 9/2018 |

OTHER PUBLICATIONS

Finnish Search Report dated Jun. 25, 2020 corresponding to Finnish Patent Application No. 20205321.

Communication of Acceptance under section 29a of Patents Decree dated Oct. 6, 2020 corresponding to Finnish Patent Application No. 20205321.

3GPP TR 23.791 V1.1.0 (Oct. 2018), Technical Report, 3rd Generation Partnership Project; Technical Specification Group Services and System Aspects; Study of Enablers for Network Automation for 5G (Release 16), Nov. 3, 2018.

3GPP TR 28.805 V16.1.0 (Dec. 2019), Technical Report, 3rd Generation Partnership Project; Technical Specification Group Services and System Aspects; Telecommunication management; Study on management aspects of communication services (Release 16), Jan. 2, 2020.

English translation of Japanese Office Action corresponding to JP Application No. 2021-006781, dated Apr. 22, 2021.

Extended European Search Report corresponding to EP Application No. 21152498.8, dated Jul. 8, 2021.

\* cited by examiner

| | E2E DELAY | DATA RELIABILITY | — | DATA RATE PER TERMINAL | SCALING INFO |
|---|---|---|---|---|---|
| BEFORE NORMALISATION | < 20 ms | > 99.5 % | — | < 2.4 Mbit/s | # OF TERMINALS < 20 |
| AFTER NORMALISATION | < 20 ms | AVAILABILITY > 99.9 % | PACKET LOSS < 0.4 % | E2E THROUGHPUT ≤ 48 Mbit/s | |

|  | DELAY | AVAILABILITY | PACKET LOSS | THROUGHPUT |
|---|---|---|---|---|
| SLS (NORMALISED) | < 20 ms | > 99.9 % | < 0.4 % | < 48 Mbit/s |
| E2E SLICE A CAPABILITY (NORMALISED) | < 15 ms | > 99.6 % | < 0.4 % | ≤ 62 Mbit/s |
| COMPARISON RESULT A | ✓ | ✗ | ✓ | ✓ |
| E2E SLICE B CAPABILITY (NORMALISED) | < 21 ms | > 99.99 % | < 0.3 % | ≤ 48 Mbit/s |
| COMPARISON RESULT | ✗ | ✓ | ✓ | ✗ |

NETWORK SLICE CONFIGURATION

FIELD

The exemplary and non-limiting embodiments of the invention relate generally to wireless communication systems. The exemplary and non-limiting embodiments of the invention relate especially to apparatuses and methods in wireless communication networks.

BACKGROUND

Wireless telecommunication systems are under constant development. There is a constant need for higher data rates and high quality of service. Reliability requirements are constantly rising and ways and means to ensure reliable connections and data traffic while keeping transmission delays minimal are constantly under development.

Developing networks enable new services to customers. One suggested service is network slicing, which enables offering connectivity, quality of service and data processing solutions tailored to specific customers' requirements. A network slice is a logical end-to-end virtual network that can be dynamically created and that provides specific capabilities and characteristics. Multiple network slices may be created on top of a common shared physical network infrastructure to run services that may have different requirements on latency, reliability, throughput and mobility.

EP3306987 discloses a method for instantiating a network slice and 3GPP TR 23.791 V1.1.0 (2018-10) 3rd Generation Partnership Project; Technical Specification Group Services and System Aspects; Study of Enablers for Network Automation for 5G (Release 16). [online], 2018-11-03, relates to network automation in 5G.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus of claim 1.

According to an aspect of the present invention, there is provided a method of claim 8.

According to an aspect of the present invention, there is provided a computer programs comprising instructions of claim 15.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a communication device, a network element of a communication system, a distributed realisation of a network element, a base station, eNodeB, gNodeB, a distributed realisation of a base station, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
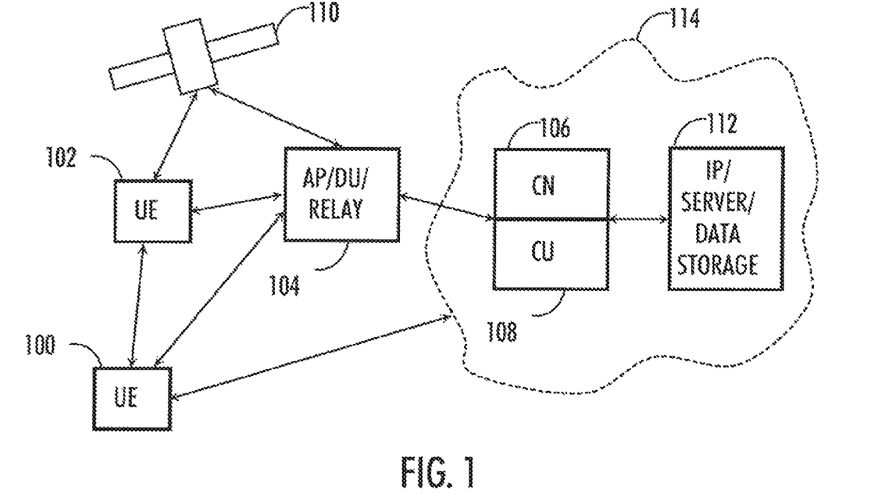
FIGS. 1 and 2 illustrate examples of simplified system architecture of a communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). A satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). An HNB Gateway (HNB-GW), which is typically installed within an operator's network may aggregate traffic from a large number of HNBs back to a core network.

Figure 2:
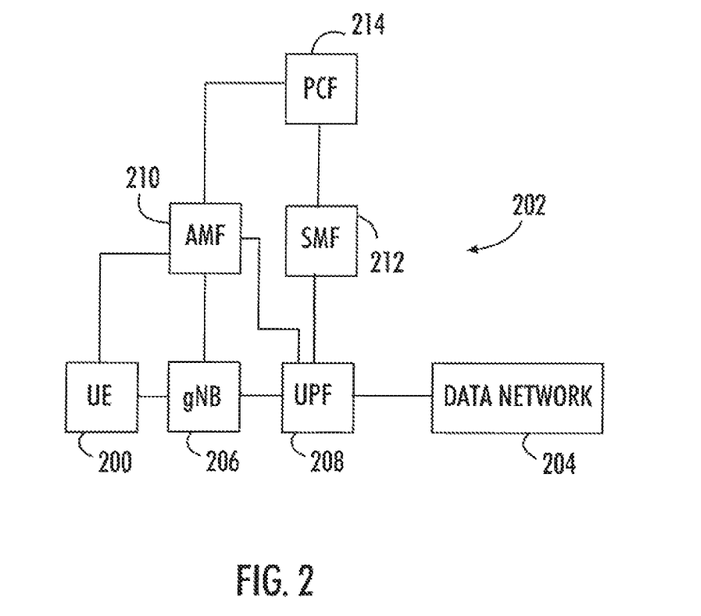

FIG. 2 illustrates an example of a communication system based on 5G network components. A user terminal or user equipment 200 communicating via a 5G network 202 with a data network 204. The user terminal 200 is connected to a base station or gNB 206 which provides the user terminal a connection to data network 204 via one or more User Plane Functions 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release and a Policy Control Function 214 which is configured to govern network behavior by providing policy rules to control plane functions.

As mentioned, network slicing is a concept where network resources of an end-to-end connection between a user terminal and another end point in a public land mobile network (PLMN) are sliced. Similar network slicing may be employed also in private networks. A network slice may be understood as a logical end-to-end network that can be dynamically created and/or modified. The network(s) between the end devices may all be sliced from one end device to the other end device, the slices thus forming logical pipelines within the network(s). User terminal may access a slice over a radio interface. A pipeline/slice may serve a particular service type. So far, three different network slice/service types have been standardized: eMBB (slice suitable for the handling of 5G enhanced Mobile Broadband), URLLC (slice suitable for the handling of ultra-reliable low latency communications) and MIoT (slice suitable for the handling of massive Internet of Things). Communications Service Providers (CSPs) are able to define additional network slice/service types if needed. A given user terminal may access to multiple slices over the same Access Network (over the same radio interface, for example).

Thus, network slicing enables a communications service provider to provide dedicated virtual networks over a common network infrastructure. The different virtual or logical networks may be designed to provide different networking characteristics such as different qualities of service, QoS, in order to host services with diverse requirements and service level agreements, SLAs. For example, the virtual networks may be customized to meet specific needs of various applications, services, devices, customers and/or operators.

Typically, communication services of a communication network are described in a Service Catalogue by means of dedicated items (such as network slice blueprints), which are presented to customers. In this approach, the blueprint fitting best the requirements of the customer may be chosen.

However, the resource requirements (the share of overall capacity) for the network typically need to be calculated for each service request. In the current system, a Mobile Network Operator (MNO) or a Service Provider (SP) plans and creates communication services which can be provided in his network based on his knowledge about the capabilities and overall capacity of the network.

With the approach described above, the customer can only choose from the items of a Service Catalogue, i.e., a predefined slice (blueprint) that supports a dedicated service class.

In case the customer needs a service defined by himself (and not based on a blueprint), the customer may create a service request to a personalized service comprising a description for a service with a dedicated Service Level Specification (SLS) containing a set of service characteristics described by certain parameters and their attributes. Currently it is not straightforward for the MNO or SP to instantly decide whether a suitable slice may exist (by modifying a Service Catalogue item, for example) or can be created, and to what extent the slice performance and characteristics can satisfy the requested SLSs.

It may be noted here, that typically SLS is a sub-part of the SLA, i.e., only containing the technical specification of a service but not the more business related specifications (such as, overall service priority, flexibility in terms of achievable service quality or SLS requirements, prioritization or weighting of key performance indicators, KPIs, potential fines for service degradation or outage, for example).

Hence, the MNO or SP has to determine if the requested service can be hosted in the network, i.e., if a slice can be created which supports this service's SLSs, and that provides the requested quality according to Service Level Agreement, SLA. This can be a rather complex and time-consuming task.

An embodiment of the invention describes a solution for determining, describing and providing the configuration of a network slice according to a service request received from a customer. The service request may comprise service requirements which need to be mapped to the characteristics of a network slice with respect to performance parameters and attributes.

Figure 3:
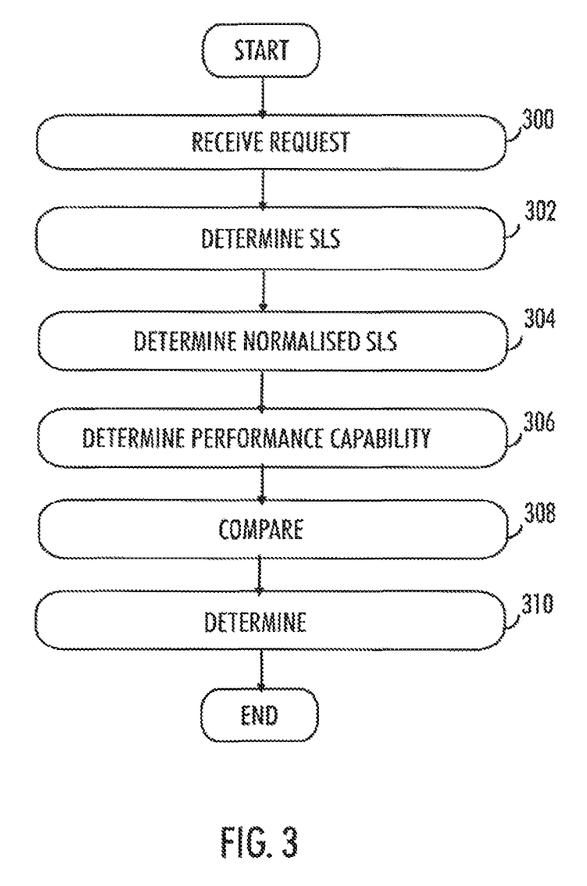
FIG. 3 is a flowchart illustrating embodiments of the invention.

The flowchart of FIG. 3 illustrates an embodiment. The flowchart illustrates an example of the operation of a network apparatus or entity configured to process service requests. The network apparatus or entity may comprise one or more network elements. Thus, the operation may be performed by one or more network elements that may be physically separate and located in different locations.

In step 300, the apparatus is configured to receive a service request comprising service requirements of a service. In an embodiment, the service request relates to multiple services.

In step 302, the apparatus is configured to determine, based on the request, a service level specification, SLS, of the requested service, the specification comprising performance parameters and network functions to support the service.

In an embodiment, the performance parameters may comprise end-to-end latency, throughput, packet loss, for example. The SLS may further comprise the identification of the scale of the service(s), such as number of terminals or geographical area. The network functions in radio, transport, and core network supporting the service(s) may be identified. In an embodiment, the determined service level specification comprises attributes of the performance parameters.

In step 304, the apparatus is configured to normalise the determined service level specification by scaling the performance parameters according into a given normalisation model of the network to obtain normalised service level specification.

In an embodiment, the apparatus is configured to map the performance parameters of the service level specification to parameters available in the given normalisation model when determining the normalised service level specification.

In step 306, the apparatus is configured to determine, based on the network functions and the given normalisation model, normalised performance capability of the network functions and configuration of a network slice supporting the requested service.

In an embodiment, one or more alternative configurations and normalised performance capabilities of a network slice supporting the requested service are determined.

In step 308, the apparatus is configured to compare the normalised service level specification to the normalised performance capability.

In an embodiment, the normalised service level specifications of the one or more alternative configurations are compared to the normalised performance capability.

In step 310, the apparatus is configured to determine, based on the comparison, whether the requested service can be realised with the network slice, and if so, create the slice.

In an embodiment, the apparatus is configured to utilise information on network topology and network resources, when determining performance capability of the network functions.

In an embodiment, a system and method to determine, describe and provide the configuration of a network slice for a customer requested service is provided. This includes determining if a service request can be served by the network, thereby fulfilling the service level agreement, SLA, of the service. The determining may be based on a comparison of the service requirements with the network capabilities. In an embodiment, both the service requirements with the network capabilities may be based on a normalised description. An example overview of the system with the different functions or entities and their interactions is illustrated FIG. 4.

Figure 4:
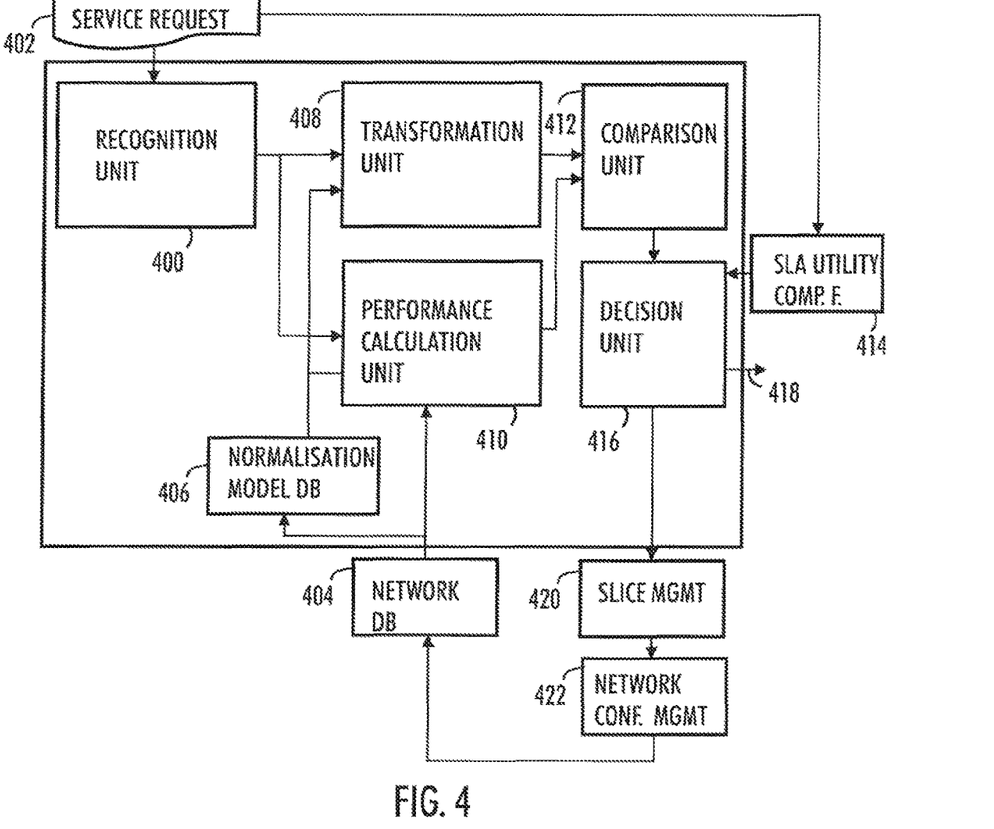
FIG. 4 illustrates an example of different functions or entities and their interactions.

The system comprises a SLS recognition unit 400. The recognition unit 400 is configured to receive a service request 402 (or request for multiple services) from a customer. In an embodiment, the service request can be delivered in any form (in a defined language, in free text, for example). The recognition unit 400 is configured to recognise the service request, and parse it into a machine-readable description, for example.

In an embodiment, the recognition unit 400 is configured to identify relevant performance parameters (such as end-to-end, E2E, latency, packet loss, throughput) and attributes (or target values/ranges) for the performance parameters. In an embodiment, attributes can in general be set either to one value, two or more values, for example <minimum, maximum>, <best, averaged worst-case>, or to probability distributions of the quantity. The interpretation of the attributes may be defined, e.g. "the delay must not be worse than X".

The recognition unit 400 may be further configured to identify the network functions for carrying out the service of the service request. The identification may be performed based on best practice information and/or learning, for example.

As an output, the recognition unit 400 may be configured to produce Service Level Specification (SLS). The SLS comprises machine-readable description of the service(s), performance parameters, attributes for the relevant performance parameters and Network Functions (on an E2E path) to support the service. It may further comprise the identification of the scale of the service(s), e.g., number of terminals or geographical area.

The system further comprises a network topology and resource database 404 which comprises information on the current topology and resources of the network.

The system may further comprise a normalisation model database 406. In an embodiment, the normalisation model database may provide a description of performance parameters in the network as well as the corresponding attribute ranges in a normalised representation and valid within the complete network. The normalisation model database is connected to and receives data from the network topology and resource database. In an embodiment, the normalisation model database 406 can be created in an automated or manual way.

Figure 5:
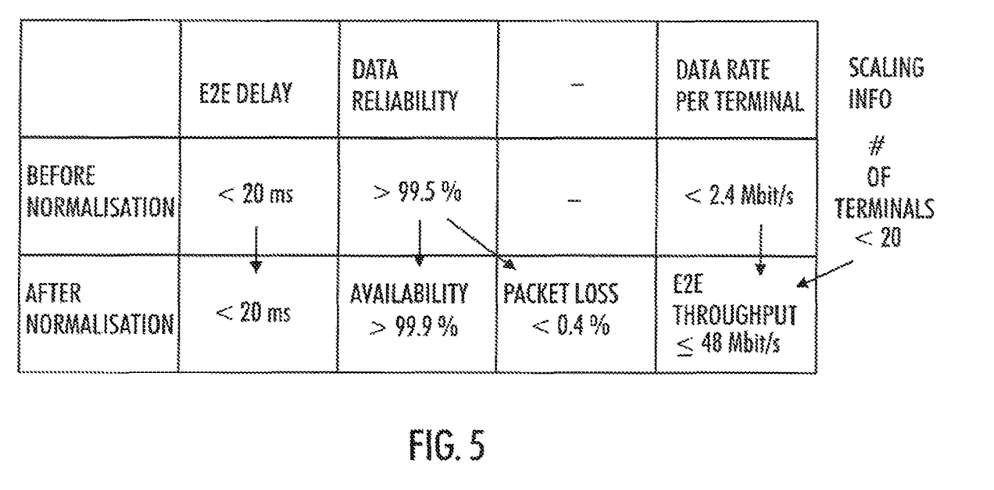
FIG. 5 illustrates an example of normalisation.

An example for the normalisation of SLS performance characteristics and attributes is illustrated in FIG. 5. In the example, E2E delay does not need normalisation. Data reliability is mapped to availability and packet loss. Data rate per terminal is mapped to E2E throughput taking the number of terminals into account.

Returning to FIG. 4, the system further comprises a SLS transformation unit 408. In an embodiment, the SLS transformation unit 408 receives as an input the Service Level Specification (SLS) from the recognition unit 400 and data from the normalisation model database 406. The transformation unit 408 may be configured to produce normalised SLS comprising normalised attributes for the performance parameters.

In an embodiment, the SLS transformation unit 408 normalises the SLS provided by the SLS recognition unit 400 into a normalised SLS according to the normalised representation of performance parameters and attributes according to normalisation model database. This may include, for example, the mapping of parameters provided with the SLS to parameters available from the normalisation model, and the recalculation of attributes, for instance, bandwidth, data rate and throughput.

Figure 6:
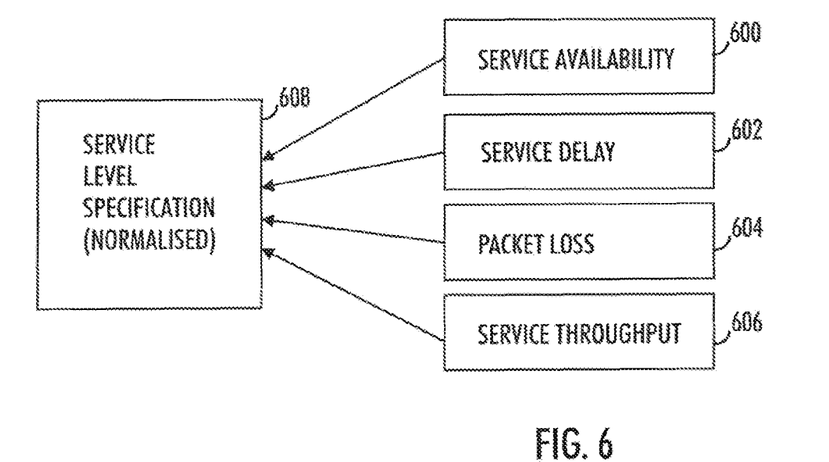
FIG. 6 illustrates an example of operation of transformation unit.

FIG. 6 illustrates an example. Parameters such as service availability 600, service delay 602, packet loss 604 and service throughput 606 normalised according to normalisation model are included in the normalised SLS 608.

In some cases, the information provided by the SLS recognition unit 400 may be incomplete. For example, there may be missing attributes (such as dedicated key performance indicators, KPIs). In an embodiment, the SLS transformation unit 408 may complete the SLS during normalisation, for example based on historic or learned data.

Returning to FIG. 4, the system further comprises a performance calculation unit 410. In an embodiment, the performance calculation unit 410 receives as an input from the recognition unit 400 the network functions for carrying out the service of the service request, normalisation model from the normalisation model database 406, scaling information (such as number of terminals, geographical area and information on network topology and resources from the network topology and resource database 404.

In an embodiment, the performance calculation unit 410 is configured to determine, based on the network functions and the given normalisation model, normalised performance capability of the network functions and configuration of a network slice supporting the service request.

In an embodiment, the performance calculation unit 410 selects from the network functions for carrying out the service(s) an E2E slice blueprint and create a configuration for the slice instance. Utilising information from the network topology and resource database, the performance calculation unit may determine the current status regarding the availability and performance of the network functions and the corresponding resources. The current status information may be normalised using the normalisation model from the database 406. Further, an aggregated normalised performance capability description may be computed for the selected E2E slice instance.

Thus, in an embodiment, the performance calculation unit 410 provides as an output an E2E slice instance configuration, a normalised performance capability description of the E2E slice instance (aggregated performance capability of network functions to build the slice). The configuration parameters and the attributes of the normalised description match the attributes of the SLS derived by the SLS recognition unit 400.

In an embodiment, the performance calculation unit may propose multiple alternative E2E slices with different configurations.

Figure 7:
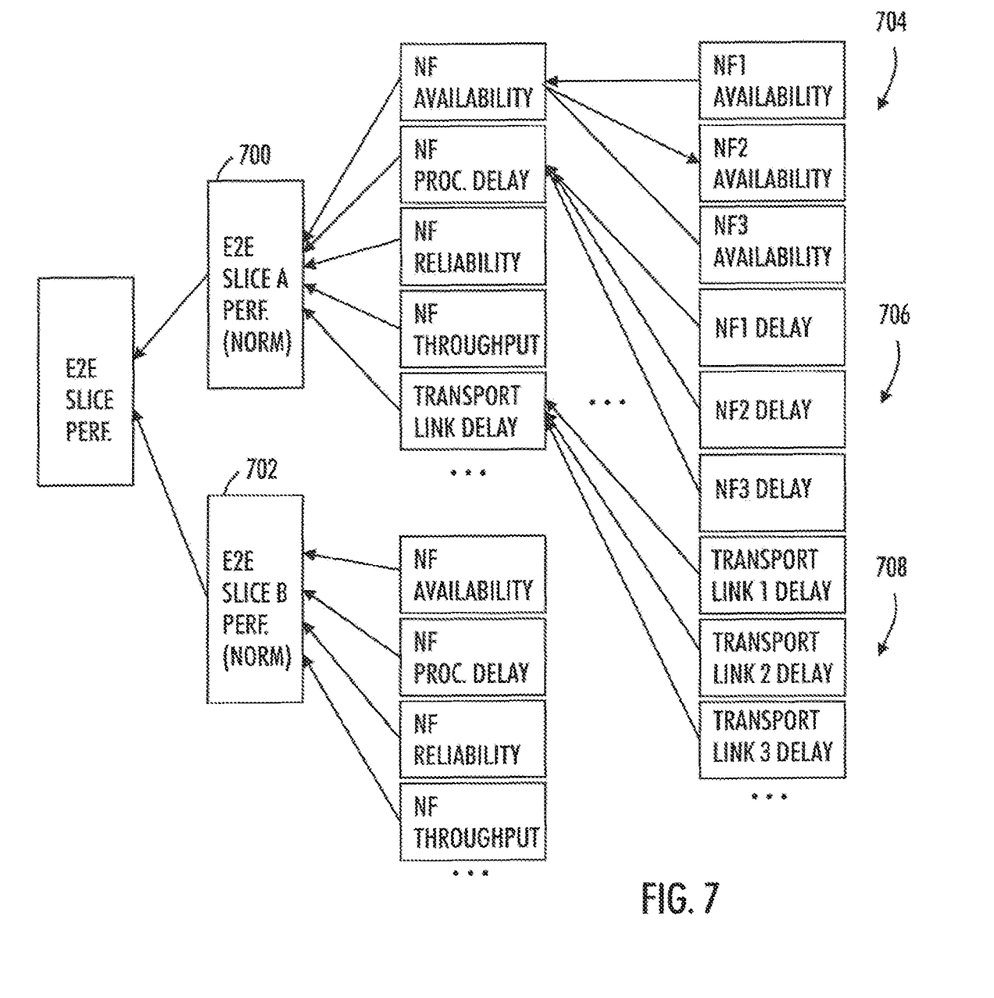
FIG. 7 illustrates an example of operation of performance calculation unit.

FIG. 7 illustrates an example of network (E2E slice) capability composition performed by the performance calculation unit. In the illustrated example, two slice instances 700, 702 are calculated. For slice instance 700, the availability of determined network functions 704 is determined. In a similar manner, network function delays 706 and transport link delays 708 are calculated. Similar calculations are performed for network function reliability and network function throughput and other parameters (not shown in FIG. 7 for simplicity). Corresponding calculations are made for slice instance 702.

Returning to FIG. 4, the system further comprises a comparison unit 412. In an embodiment, the comparison unit 412 receives as an input normalised SLS from the transformation unit 408 and E2E slice configuration and normalised performance capability description of network functions in feasible E2E slice from the performance calculation unit 410. In case the performance calculation unit provided more than one alternative slices, data on these is received as well.

In an embodiment, the comparison unit 412 compares the normalised service level specification to the normalised performance capability.

In an embodiment, the comparison unit 412 is configured to perform comparison between requirements described in normalised SLS and normalised E2E slice capabilities. The comparison result may be a per-performance-parameter value on the difference (if applicable) between the requirement and the capabilities. In case the performance calculation unit provided more than one alternative slices, the result is provided per alternative E2E slice In an embodiment, the comparison unit 412 provides as an output comparison result for all relevant performance and configuration parameters and optionally for all alternative E2E slice configurations.

Figure 8:
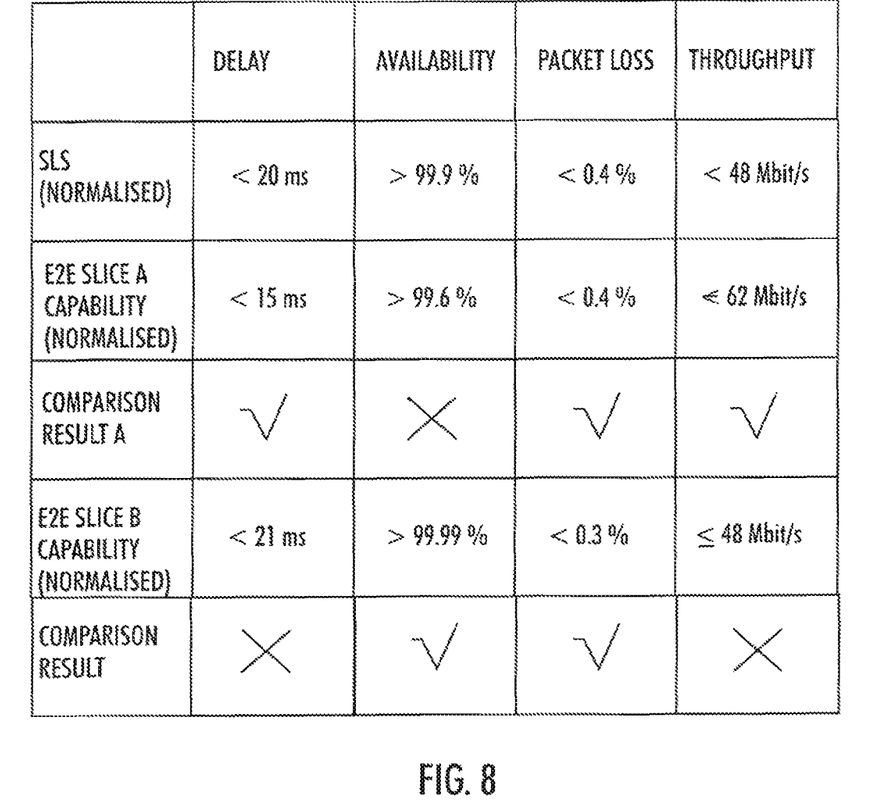
FIG. 8 illustrates an example of comparison result.

FIG. 8 illustrates an example of a comparison result made by the comparison unit for two different E2E slices A and B against the normalised service level specification. The comparison provides values for delay, availability, packet loss and throughput. Slice A fulfils requirements of all values except availability. Slice B in turn fulfils requirements of availability and packet loss.

Returning to FIG. 4, the system further comprises a decision unit 416. In an embodiment, the decision unit 416 receives as an input the comparison result from the comparison unit 412. The decision unit 416 may also receive as an input data from SLA utility function 414. The data may comprise customer priority values, for example. In an embodiment, the data comprises overall service priority, flexibility in terms of achievable service quality or SLS requirements, prioritization or weighting of KPIs, potential fines for service degradation or outage, among others.

The decision unit 416 may be configured to interpret the comparison result in light of data from the SLA utility. In case all requirements can be met by the capabilities of the E2E slice, the feasibility decision regarding the slice is positive. In case not all requirements can be met by the capabilities of the E2E slice, the SLA utility data may be checked for prioritisation of performance parameters and attribute ranges as well as with other slice requests or active slices. If the performance requirements can be met with acceptable reductions (in the newly requested slice or in the active slices), the deployment decision is positive, otherwise negative.

If multiple alternative E2E slices are provided as input, the comparison is performed for more than one alternative, and the best E2E slice may be chosen, with the feasibility decision made for this best slice.

In the example of FIG. 8, SLA utility function data prioritized most data rate per terminal, next delay, and lastly reliability. Based on this, the decision unit may decide that slice A is better because it offers best data rate (throughput) and shorter delay compared to slice B.

If a negative decision is made, the customer who sent the service request is informed 418.

If a positive decision is made, the task is forwarded to slice life cycle management unit 420 and network configuration management 422.

Figure 9:
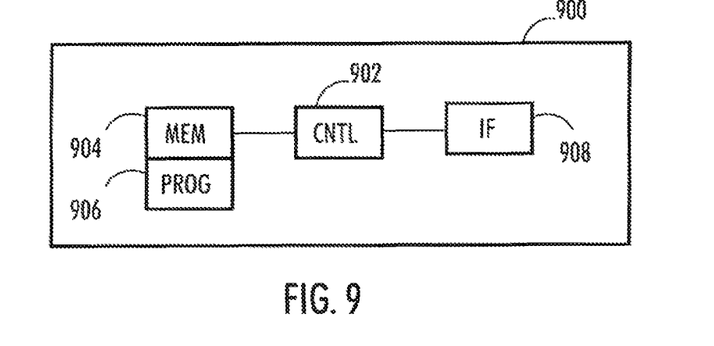
FIG. 9 illustrates a simplified example of an apparatus applying some embodiments of the invention.

FIG. 9 illustrates an embodiment. The figure illustrates a simplified example of an apparatus or network element applying embodiments of the invention. In some embodiments, the apparatus may be a network element or a part of a network element. In some embodiments, the apparatus may comprise several network entities connected to each other.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 900 of the example includes a control circuitry 902 configured to control at least part of the operation of the apparatus.

The apparatus may comprise a memory 904 for storing data. Furthermore, the memory may store software 906 executable by the control circuitry 902. The memory may be integrated in the control circuitry.

The apparatus further comprises one or more interface circuitries 908 configured to connect the apparatus to other devices and network elements of the radio access network. The interface may provide a wired or wireless connection.

In an embodiment, the software 906 may comprise a computer program comprising program code means adapted to cause the control circuitry 902 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits, ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

An embodiment provides an apparatus comprising means for receiving a service request comprising service requirements; means for determining, based on the service request, a service level specification of the request, the service level specification comprising performance parameters and network functions to support the requested service; means for normalising the determined service level specification by scaling the performance parameters according into a given normalisation model of the network to obtain normalised service level specification; means for determining, based on the network functions and the given normalisation model, normalised performance capability of the network functions and a configuration of a network slice supporting the requested service; means for comparing the normalised service level specification to the normalised performance capability; and means for determining, based on the comparison, whether the requested service can be realised with the network slice, and if so, create the slice.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a radio access network, comprising:
at least one processor; and
at least one memory including computer program code,
the at least one memory and the computer program code configured to, with the at least one processor, cause the apparatus at least to:
receive a service request comprising service requirements of a service;
determine, based on the service request, a service level specification of the service, the service level specification comprising performance parameters and network functions to support the requested service;
normalize the determined service level specification by scaling the performance parameters according into a given normalization model of the network to obtain normalized service level specification;
determine, based on the network functions and the given normalization model, normalized performance capability of the network functions and a configuration of a network slice supporting the requested service;
compare the normalized service level specification to the normalized performance capability; and
determine, based on the comparison, whether the requested service can be realized with the network slice, and upon determining that the requested service can be realized with the network slice, create the slice, and upon determining that the requested service cannot be realized with the network slice, determine from the service level agreement data when requirements in the service request comprise acceptable reductions, with which the requested service could be realized.

2. The apparatus of claim 1, wherein the determined service level specification comprises attributes of the performance parameters.

3. The apparatus of claim 1, wherein the at least one memory and the computer program code are configured to, with the at least one processor, cause the apparatus further to:
map the performance parameters of the service level specification to parameters available in the given normalization model when determining the normalized service level specification.

4. The apparatus of claim 1, wherein the at least one memory and the computer program code are configured to, with the at least one processor, cause the apparatus further to:
determine one or more alternative configurations and normalized performance capabilities of a network slice supporting the requested service; and
compare the normalized service level specifications of the one or more alternative configurations to the normalized performance capability.

5. The apparatus of claim 1, wherein the at least one memory and the computer program code are configured to, with the at least one processor, cause the apparatus further to:
utilize information on network topology and network resources, when determining performance capability of the network functions.

6. The apparatus of claim 1, wherein the at least one memory and the computer program code are configured to, with the at least one processor, cause the apparatus further to:
take service level agreement data related to the service request into account when determining whether the requested service can be realized.

7. The apparatus of claim 1, wherein the service request relates to multiple services.

8. A method, comprising:
receiving a service request comprising service requirements;
determining, based on the service request, service level specification of the request, the service level specification comprising performance parameters and network functions to support the requested service;
normalizing the determined service level specification by scaling the performance parameters according into a given normalization model of the network to obtain normalized service level specification;
determining, based on the network functions and the given normalization model, normalized performance capability of the network functions and a configuration of a network slice supporting the requested service;
comparing the normalized service level specification to the normalized performance capability; and
determining, based on the comparison, whether the requested service can be realized with the network slice, and upon determining that the requested service can be realized with the network slice, create the slice, and upon determining that the requested service cannot be realized with the network slice, determining from the service level agreement data when requirements in the service request comprise acceptable reductions, with which the requested service could be realized.

9. The method of claim 8, wherein the determined service level specification comprises attributes of the performance parameters.

10. The method of claim 8, further comprising:
mapping the performance parameters of the service level specification to parameters available in the given normalization model when determining the normalized service level specification.

11. The method of claim 8, further comprising:
determining one or more alternative configurations and normalized performance capabilities of a network slice supporting the requested service; and
comparing the normalized service level specifications of the one or more alternative configurations to the normalized performance capability.

12. The method of claim 8, further comprising:
utilizing information on network topology and network resources, when determining performance capability of the network functions.

13. The method of claim 8, further comprising:
take service level agreement data related to the service request into account when determining whether the requested service can be realized.

14. The method of claim 8, wherein the service request relates to multiple services.

15. A computer program embodied on a non-transitory computer-readable medium, said computer program comprising instructions which, when executed on an apparatus, cause the apparatus to perform at least:
receiving a service request comprising service requirements of a service;
determining, based on the service request, a service level specification of the requested service, the service level specification comprising performance parameters and network functions to support the requested service;
normalizing the determined service level specification by scaling the performance parameters according into a given normalization model of the network to obtain normalized service level specification;
determining, based on the network functions and the given normalization model, normalized performance capability of the network functions and a configuration of a network slice supporting the requested service;
comparing the normalized service level specification to the normalized performance capability; and determining, based on the comparison, whether the requested service can be realized with the network slice, and upon determining that the requested service can be realized with the network slice, create the slice, and upon determining that the requested service cannot be realized with the network slice, determine from the service level agreement data when requirements in the service request comprise acceptable reductions, with which the requested service could be realized.

\* \* \* \* \*